J. WILKINSON AND E. D. DICKINSON.
GEARING.
APPLICATION FILED MAY 9, 1919.
1,403,531.
Patented Jan. 17, 1922.
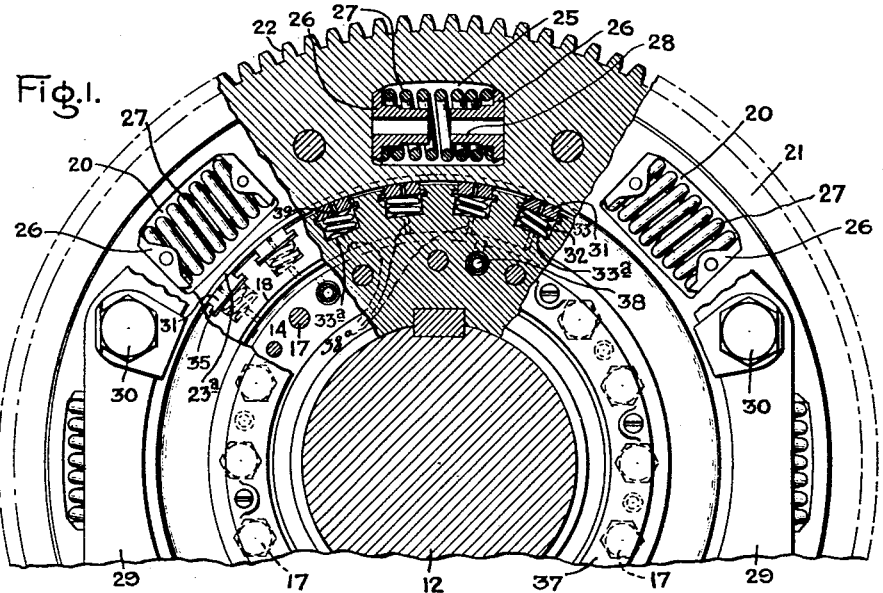
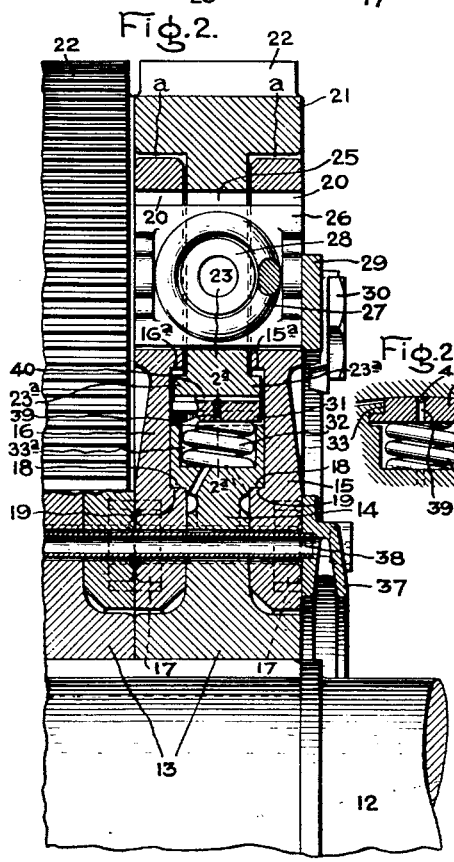
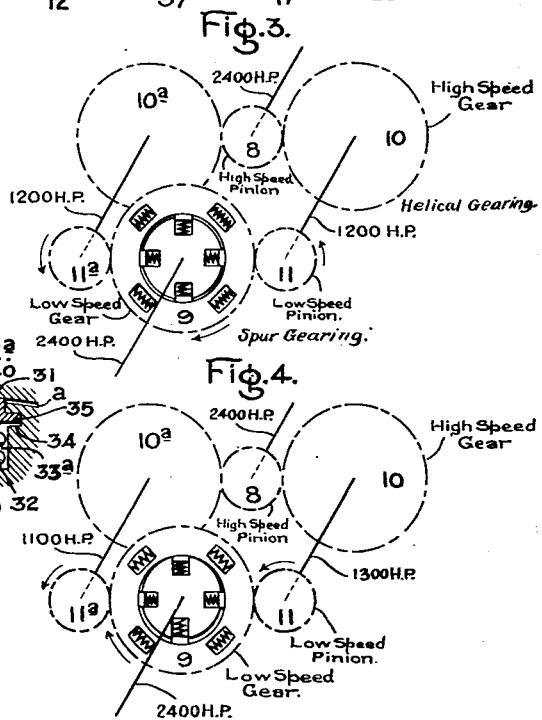
Inventors:
Edgar D. Dickinson,
James Wilkinson,
by
Albert G. Davis
Their Attorney

UNITED STATES PATENT OFFICE.

JAMES WILKINSON AND EDGAR D. DICKINSON, OF SCHENECTADY, NEW YORK, ASSIGNORS TO GENERAL ELECTRIC COMPANY, A CORPORATION OF NEW YORK.

GEARING.

1,403,531.   Specification of Letters Patent.   Patented Jan. 17, 1922.

Application filed May 9, 1919. Serial No. 295,922.

*To all whom it may concern:*

Be it known that we, JAMES WILKINSON and EDGAR D. DICKINSON, citizens of the United States, residing at Schenectady, in the county of Schenectady, State of New York, have invented certain new and useful Improvements in Gearing, of which the following is a specification.

The present invention relates to gearing and particularly to gearing of the double reduction or multiplication type, wherein power is transmitted between a high speed pinion drive and a low speed gear wheel by means of two or more sets of intermediate speed gear wheels each set comprising a high speed gear wheel which meshes with the high speed pinion and a low speed pinion which meshes with the low speed gear wheel. The more general application of such gearings is for speed reductions and we shall hereinafter more specifically describe our invention as a reduction gearing although it will be understood that it is not necessarily limited thereto.

One object of our invention is to provide an improved gearing of the type referred to wherein the low speed gear wheel is of the spur gear type and is of such structure that it has both circumferential and radial flexibility whereby it may serve to effect substantially equal distribution of the load between the sets of intermediate gear wheels.

A further object of our invention is to provide an improved gear wheel which is flexible both circumferentially and radially.

In the drawing, Fig. 1 is a side elevation, partly broken away, of a gear wheel embodying our invention; Fig. 2 is a radial section of the gear wheel shown in Fig. 1; Fig. 2$^a$ is a section taken on line 2$^a$—2$^a$, Fig. 2; and Figs. 3 and 4 are views of a diagrammatic nature showing a double reduction gearing embodying our invention and illustrating the manner in which it operates.

Referring first to Figs. 3 and 4, 8 indicates a high speed pinion, 9 a low speed gear wheel, and 10, 11 and 10$^a$, 11$^a$ two sets of intermediate speed gear wheels through which power is transmitted in parallel from pinion 8 to gear wheel 9. High speed pinion 8 and high speed gear wheels 10 and 10$^a$ which mesh therewith form the high speed end of the gearing and they may have teeth of any suitable type such as, for example, double helical teeth. Low speed gear wheel 9 and low speed pinions 11 and 11$^a$ which mesh therewith, form the low speed end of the gearing and they have straight teeth, that is, they are of the spur type.

Now, according to our invention, we introduce into this gearing combination, a low speed gear wheel 9 which is flexible both circumferentially and radially, whereby we obtain certain advantages as is pointed out hereinafter.

Preferably we utilize a low speed gear wheel of the specific structure shown in Figs. 1, 2 and 2$^a$, the same being made up of a plurality of sections each section comprising a web member carried by the shaft and a rim member which is yieldingly connected to the web member in such manner that it may move both radially and circumferentially thereof. Referring to Figs. 1 and 2, 12 indicates a shaft on which are mounted a number of hubs 13 each carrying a web comprising a central member 14 formed integral with the hub 13, and two side plates 15 and 16 bolted to central member 14 by bolts 17. The central member 14 has shoulders 18 on opposite sides and side-plates 15 and 16 have shoulders 19 which engage thereunder. These shoulders serve to take the centrifugal stresses off bolts 17. Side plates 15 and 16 extend well beyond the periphery of central member 14, thus leaving an annular groove between them, and they are provided with annular shoulders 15$^a$ and 16$^a$ and with circumferentially spaced rectangular openings 20. Surrounding the side plates 15 and 16 is a rim member 21 having straight teeth 22 on its outer surface and an inwardly projecting annular tongue 23 which is located in the groove between side plates 15 and 16, and has flanges 23$^a$ on opposite sides which are located under shoulders 15$^a$ and 16$^a$. In tongue 23 are rectangular openings 25 which are axially aligned with openings 20 and at opposite ends of the aligned openings are rectangular spring holders 26 which at their central portions rest against tongue 23 with the ends projecting over side plates 15 and 16. In other words, holders 26 are of an axial length equal to the width of tongue 23 and side plates 15 and 16. Engaging spring holders 26 are springs 27 which are centered by short posts 28 projecting from holders 26 toward each other. Posts 28 are normally spaced a short distance apart and serve also as stops to limit the relative circumferential movement. With the foregoing arrangement it will be clear that the rim member 21 is capable of circumferential movement in either direction relative to the hub member, such movement taking place against the action of springs 27. To maintain springs 27 against axial displacement an annular spring retaining ring 29 is provided fastened in place by bolts 30.

The internal diameters of rim member 21 and tongue 23 are slightly greater than the diameters of side plates 15 and 16 and central member 14 leaving a slight radial clearance, as indicated at $a$, and the rim member is normally held concentric with the web member by means of a number of spring shoes 31 carried by the web member and pressed against the tongue 23 by springs 32. Spring shoes 31 are located in transverse slots 33 in the periphery of central member 14 and are spaced suitable distances apart. Slots 33 are provided with transverse grooves 34 in which are located flanges 35 projecting from opposite sides of shoes 31. Grooves 34 are of greater radial depth than the thickness of flanges 35 so as to leave suitable clearances to permit of radial movement of rim member 21 relative to the flange member. Beneath transverse slots 33 are sockets 33$^a$ in which springs 32 are located. Springs 32 hold spring shoes 31 firmly against the inner surface of tongue 23 so as to normally maintain the rim member 21 concentric with shaft 12. The radial clearance $a$ is of an amount to permit of the desired radial movement of the rim member 21 relatively to the web member and of course when this amount of movement has taken place the parts come into contact so no further radial movement is possible. It will also be noted that there is a limited amount of axial clearance between the rim member and the web member so that adjustments in such direction may take place.

There are as many gear sections of the character just described as is found desirable to give the desired width of gear face and they are all suitably keyed to the shaft side by side. In the drawing one section and a part of another is shown, the remaining section being omitted as all are alike. However, we may, if found desirable, form the gear wheel of only a single section.

To lubricate the moving parts of the gear wheel we provide an oil deflector ring 37 to which oil is supplied from any suitable source and from which it is fed through one or more conduits 38 to a suitable annular chamber (not shown) within the gear wheel. From this chamber oil is distributed through suitable passages as indicated at 38$^a$ to the spring shoes 31. Through the center of each spring shoe 31 is an oil groove 39 which communicates with a transverse oil groove 40 in the face of the spring shoe. As a rule there are shaft bearings directly adjacent the gear wheel on each side and under such circumstances oil deflector rings will be provided on each side of the gear wheel and the spill of oil from the bearings may be fed directly by centrifugal force to such oil deflector rings.

The operation of double reduction gearing embodying our invention is illustrated in Figs. 3 and 4 where numerical values are given by way of example but not as a limitation of our invention. Assuming 2400 horse-power is to be transmitted from pinion 8 to gear wheel 9, then with equal division of the load each intermediate set of gear wheels will transmit 1200 horsepower. The radial springs 32 are given an initial compression so that with equal division of load, i. e. during normal operating, no radial deflection of the rim member 21 can occur. When a predetermined degree of unbalancing is reached, however, the radial springs will commence to yield and by so doing prevent any further degree of unbalancing. The radial yielding action which takes place is indicated in Fig. 4, wherein one intermediate set of gear wheels is assumed to be transmitting 1100 horsepower and the other 1300 horsepower. As will be clear from a consideration of Figs. 3 and 4, one low speed pinion is driving against gear wheel 9 in one direction and the other in the opposite direction, as indicated by the arrows. The greater horsepower indicated as being transmitted by pinion 11 effects a downward movement of rim member 21, thus transferring load from the right hand intermediate set of gear wheels to the left hand set. Were the unbalancing of the load between the two intermediate sets of gear wheels in the opposite sense, then rim member 21 would move upward instead of downward, that is, the movement would be opposite to that shown in Fig. 4.

The circumferentially yieldable springs 27 are also put into place under compression and this is preferably of such a degree that for normal loads the springs 27 do not yield. The gear wheel then acts as a solid gear. In cases of abnormal torsional shocks, however, springs 27 yield and prevent such shocks from being transmitted to the gear teeth.

Furthermore, by making the low speed end of the gear of the spur type, that is, having straight teeth, it will be clear that axial shocks will not affect them since such shocks will be in a direction parallel to the teeth themselves. Furthermore, said shocks will not be transmitted to the high speed end of the gear but will be taken up by thrust bearings such as are usually provided.

In the present instance, the gearing shown in Figs. 3 and 4 is of the single plane type, that is, the axes of the shafts which carry the gear wheels all lie in the same plane and low speed pinions 11 and 11ª are diametrically opposite each other, there being two sets of intermediate gear wheels, and this is the arrangement which we prefer and to which our invention is particularly applicable. Also we preferably make the high speed end of the gearing, that is, high speed pinion 8 and high speed gear wheels 10 and 10ª, of the double helical or herringbone type, the low speed end of the gearing having straight or spur teeth. It will be understood, however, that our invention, as to all its aspects, is not limited to such arrangements.

Our improved gear is particularly well adapted for use in ship propulsion, the gear serving to transmit power from a high speed prime mover to a low speed propeller, and when used for this purpose it will be clear it will ensure equal division of the load between the intermediate sets of gear wheels and at the same time take care of torsional shocks and protect the gear teeth from fore and aft shocks.

Certain features of structure disclosed in this application are not claimed herein as they form the subject matter of the sole application of Edgar D. Dickinson, one of the joint applicants, Serial No. 300,149, filed May 27, 1919.

In accordance with the provisions of the patent statutes, we have described the principle of operation of our invention together with the apparatus which we now consider to represent the best embodiment thereof, but we desire to have it understood that the apparatus shown is only illustrative and that the invention can be carried out by other means.

What we claim as new and desire to secure by Letters Patent of the United States, is:—

1. In a double reduction gearing, a high speed end comprising a high speed pinion and a high speed gear wheel, and a low speed end comprising a low speed gear wheel and a low speed pinion, said low speed gear wheel being yieldable both circumferentially and radially.

2. In a double reduction gearing, a high speed pinion, a low speed gear wheel, and a plurality of sets of intermediate speed gear wheels through which power is transmitted between the pinion and gear wheel, said low speed gear wheel being yieldable both circumferentially and radially.

3. In a double reduction gearing, a high speed pinion, a low speed gear wheel, a plurality of sets of intermediate speed gear wheels through which power is transmitted between the pinion and the gear wheel, said low speed gear wheel comprising a rim member and hub member which are yieldable both radially and circumferentially relatively to each other.

4. In a double reduction gearing, a high speed pinion, a low speed gear wheel axially aligned therewith, and two sets of intermediate gear wheels located on diametrically opposite sides of said pinion and gear wheel, and transmitting power between them, said low speed gear wheel comprising a hub member, a rim member, and means yieldingly connecting them whereby they may move both radially and circumferentially relatively to each other.

5. In a double reduction gearing, a high speed end comprising a high speed pinion and a high speed gear wheel having helical teeth, and a low speed end comprising a low speed pinion and a low speed gear wheel having straight teeth, at least one of the gear wheels of said low speed end being yieldable both radially and circumferentially.

6. In a double reduction gearing, a high speed end comprising a high speed pinion and a high speed gear wheel having helical teeth, and a low speed end comprising a low speed pinion and a low speed gear wheel having straight teeth, said low speed gear wheel being yieldable both radially and circumferentially.

7. In a double reduction gearing, a high speed pinion, a low speed gear wheel axially aligned therewith, and two sets of intermediate speed gear wheels located on diametrically opposite sides of said pinion and gear wheel and transmitting power between them, said low speed gear wheel having straight teeth and comprising a hub member, a rim member, and spring means which yieldingly connect them together whereby they may move both radially and circumferentially relatively to each other.

8. In a double reduction gearing, a high speed end comprising a high speed pinion and a high speed gear wheel and a low speed end comprising a low speed gear wheel and a low speed pinion, said low speed gear wheel comprising a rim member, a hub member, and radially extending spring means which normally holds the rim member concentric with the hub member and yields only under abnormal conditions.

9. In a double reduction gearing, a high speed pinion, a low speed gear wheel, a plurality of sets of intermediate speed gear wheels through which power is transmitted between the pinion and gear wheel, said low speed gear wheel comprising a rim member and a hub member which are yieldable radially relatively to each other.

10. In a double reduction gearing, a high speed pinion, a low speed gear wheel axially aligned therewith and two sets of intermediate gear wheels located on diametrically opposite sides of said pinion and gear wheel and transmitting power between them, said low speed gear wheel comprising a hub member and rim member and means yieldingly connecting them whereby they may move radially relatively to each other.

11. In a double reduction gearing, a high speed end comprising a high speed pinion and a high speed gear wheel having helical teeth, and a low speed end comprising a low speed pinion and a low speed gear wheel having straight teeth, certain of the gear wheels of said low speed end comprising rim and hub members which are yieldable radially relatively to each other.

12. In a double reduction gearing, a high speed pinion, a low speed gear wheel axially aligned therewith and two sets of intermediate gear wheels located on diametrically opposite sides of said pinion and gear wheel and transmitting power between them, said low speed gear having straight teeth and comprising a web member, a rim member surrounding the web member and slightly spaced therefrom and spring means carried by one of said members and engaging the other to yieldingly hold said rim member centered relatively to the web member.

13. In a power transmitting mechanism, a web member, a rim member surrounding it, said rim member being of greater internal diameter than the web member, radially yieldable means for normally holding said rim member in concentric relation to the web member, and circumferentially yieldable means connecting said rim member and web member together, said radially yieldable means yielding only in case of abnormal conditions.

14. In a power transmitting mechanism, a web member, a rim member surrounding it, and spaced radially therefrom, radially yieldable spring means located between the web member and the rim member for normally holding them in concentric relation to each other, and circumferentially yieldable spring means connecting said members together whereby one may drive the other.

15. In combination, a web comprising a central member and two side plates which project beyond the periphery thereof, a rim surrounding the web and having a tongue located between said side plates, there being radial clearance between the rim and the web, and spring means located between said side plates and engaging said central member and tongue which yieldingly hold the rim concentric with the web.

16. In combination, a web comprising a central member and two side plates which project beyond the periphery thereof, a rim surrounding the web and having a tongue located between said side plates, there being radial clearance between the rim and the web, said side plates and tongue being provided with axially aligned circumferentially spaced openings, spring means in said openings which engage both the tongue and the side plates, and spring means located between the rim and web and acting in a radial direction to yieldingly hold the rim and web in concentric relation to each other.

17. In combination, a web comprising a central member and two side plates which project beyond the periphery thereof, a rim surrounding the web and having a tongue located between said side plates, there being radial clearance between the rim and the web, said central member being provided with circumferentially spaced transverse slots in its periphery, spring shoes located in said slots, springs located beneath said shoes for holding said shoes against said tongue, and means connecting the rim and web so one may be rotated by the other.

18. In combination, a web comprising a central member and two side plates which project beyond the periphery thereof, a rim surrounding the web and having a tongue located between said side plates, there being radial clearance between the rim and the web, said side plates and tongue being provided with axially aligned circumferentially spaced openings, spring means in said openings which engage both the tongue and the side plates, said central member being provided with circumferentially spaced transverse slots in its periphery, spring shoes located in said slots, and springs located beneath said shoes for holding said shoes against said tongue.

19. A gear wheel comprising a plurality of sections mounted side by side, each section comprising a hub, a web fixed thereto and having side plates, a toothed rim surrounding the web, a tongue carried by the rim and projecting between said side plates, said tongue and side plates being provided with axially aligned circumferentially spaced openings, springs located in said openings which yieldingly connect the rim and hub for circumferential movement, and radially acting springs located between the web and said tongue for yieldingly holding the toothed rim concentric with the hub.

In witness whereof, we have hereunto set our hands this 8th day of May, 1919.

JAMES WILKINSON.
EDGAR D. DICKINSON.